United States Patent
Lemmon et al.

(10) Patent No.: US 8,435,673 B2
(45) Date of Patent: May 7, 2013

(54) CATHODE COMPOSITION WITH PHOSPHORUS COMPOSITION ADDITIVE AND ELECTROCHEMICAL CELL COMPRISING SAME

(75) Inventors: John Patrick Lemmon, Schoharie, NY (US); Jun Cui, Glenville, NY (US); Malgorzata Iwona Rubinsztajn, Ballston Spa, NY (US); Richard Louis Hart, Albany, NY (US); Jennifer Kathleen Redline, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 773 days.

(21) Appl. No.: 12/433,107

(22) Filed: Apr. 30, 2009

(65) Prior Publication Data

US 2010/0279165 A1 Nov. 4, 2010

(51) Int. Cl.
*H01M 4/13* (2010.01)

(52) U.S. Cl.
USPC ........ 429/223; 429/209; 429/218.1; 429/319; 429/321; 429/231.1

(58) Field of Classification Search ................. 429/209, 429/218.1, 231.1, 223, 319, 321
See application file for complete search history.

(56) References Cited

U.S. PATENT DOCUMENTS

| | | | |
|---|---|---|---|
| 4,973,534 A | | 11/1990 | Adendorff et al. |
| 6,187,479 B1 * | | 2/2001 | Liu ............................. 429/300 |
| 2004/0248009 A1 * | | 12/2004 | De Jonghe et al. ........ 429/231.6 |
| 2006/0088763 A1 | | 4/2006 | Li et al. |
| 2006/0115738 A1 | | 6/2006 | Sazhin et al. |
| 2007/0243468 A1 | | 10/2007 | Ryu et al. |
| 2008/0145755 A1 * | | 6/2008 | Iacovangelo et al. ......... 429/188 |

OTHER PUBLICATIONS

Staikov, G. and Yankulov, P.D.; "Interface Phenomena in Beta Battery Systems;" from Key Engineering Materials, v. 59-60, pp. 283-304; 1991.

Prakash, Jai; Redey, Laszlo; Vissers, Donald R.; DeGruson, James; "Effect of Sodium iodide additive on the electrochemical performance of sodium/nickel chloride cells;" Journal of Applied Electrochemistry, v. 30; 1229-1233; 2000.

Kristiane Kronsbein, Investigation and Modelling of the ZEBRA System to Optimise State of Charge Detection, Thesis, Institute fur Werkstoffe der Elektrotechnik, Universitat Karlsruhe, Germany, May 2004.

J. Prakash, L. Redey and D.R. Vissers, Ionics, vol. 6, pp. 210-217 (2000).

(Continued)

*Primary Examiner* — Zachary Best
(74) *Attorney, Agent, or Firm* — GE Global Patent Operation; Peter T. DiMauro (57) ABSTRACT

A cathode composition and a rechargeable electrochemical cell comprising same are disclosed. The cathode composition is described as comprising particles of one or more transition metal, alkali halometallate having a melting point of less than about 300 degrees Celsius, and at least one phosphorus composition additive selected from P—O compositions, P-halogen compositions, P—O-halogen compositions, and their reaction products and combinations. Also described is a rechargeable electrochemical cell comprising the composition. The phosphorus composition additive in the cathode composition of a cell is effective to lower the capacity degradation rate of the cell during operation relative to absence of the additive, and effective to lower the internal resistance of the cell when under operating conditions relative to absence of the additive.

20 Claims, 3 Drawing Sheets

OTHER PUBLICATIONS

R. C. Galloway and S. Haslam, Journal of Power Sources 80 (1999) 164-170.

Prakash, Jai; Redey, Laszlo; and Vissers, Donald R.; "Electrochemical Behavior of Nonporous Ni/NiCl2 Electrodes in Chloroaluminate Melts;" Journal of the Electrochemical Society, 147 pp. 502-507, 2000.

International Search Report issued in connection with corresponding PCT Application No. PCT/US2010/025851 on Apr. 30, 2010.

R.J. Bones, D.A.Teagle and S.D. Brooker, Project Zebra. Harwell Technical Note 10, Jun. 8, 1985.

R. C. Galloway and S. Haslam. The ZEBRA Electric Vehicle Battery: Power and Energy Improvements. Journal of Power Sources 80 (1999) 164-170.

R.C. Galloway, E.R. Coetzee. Zebra Power Systems Semi-Annual report—Programme 3—Jan.-Jul. 1995.

* cited by examiner

CATHODE COMPOSITION WITH PHOSPHORUS COMPOSITION ADDITIVE AND ELECTROCHEMICAL CELL COMPRISING SAME

BACKGROUND

1. Field of Use

The invention includes embodiments that may relate to a cathodic composition with an additive for use in an electrochemical cell, and an energy storage device including the same.

2. Discussion of Art

Electrochemical cells may include a molten alkali metal (such as sodium) negative electrode or anode; an electrically insulative solid separator which functions as an alkali metal ion-conducting solid electrolyte; a salt electrolyte in the positive electrode compartment which is at least partially molten at the operating temperature of the cell; and a positive electrode The electrochemical cells of this type are useful as a power source or energy storage device.

It may be desirable to have additives or additive materials that differ from those currently available additives, as well as electrochemical cells and energy storage devices incorporating those additives.

BRIEF SUMMARY

One embodiment of the present invention is directed to a cathode composition comprising, a transition metal; an alkali halometallate; and a phosphorus composition additive in which the phosphorus composition additive is one or more of a P—O composition, P-halogen composition, or a P—O-halogen composition, or a reaction products of any of the foregoing with the alkali halometallate.

Another embodiment of the present invention is directed to an electrochemical cell comprising, a first compartment comprising metallic alkali metal; a second compartment comprising a cathode composition, the cathode composition comprising a transition metal, an alkali halometallate, and a phosphorus composition additive selected from one or more of P—O composition, P-halogen composition, P—O— halogen composition, or a reaction product of any of the foregoing with the alkali halometallate; and an electrically insulative separator capable of transporting alkali metal ions between the first and second compartments.

A yet further embodiment of the present invention is directed to an energy storage battery comprising a plurality of rechargeable electrochemical cells in accordance with the above.

DETAILED DESCRIPTION

The invention includes embodiments that may relate to an additive for use in an energy storage device, an energy storage device including the additive, and an associated method. The additive may be included in the cathode composition of the electrochemical cell. The additive will be discussed in detail following disclosure of the additive environment, that is, the cathode composition and the like.

With regard to the cathode composition, these may include a transition metal and/or a transition metal halide. Suitable transition metals may include Ni, Fe, Cu, Zn, Cr, Mn, and Co; or the like. In some embodiments, combinations of transition metals may be employed, such as nickel metal with iron metal, or such as nickel chloride with iron chloride. In some embodiments, the sole transition metal may be nickel. It may be noted that the oxidation state of the transition metal depends upon the charging status of the cathode composition when used as part of a rechargeable cell: when in a charged state, the transition metal may be predominantly in transition metal halide form; when in a discharged state, the transition metal may be predominantly in metallic form.

In certain embodiments, the transition metal component of the cathode composition, when in a discharged state, may be in the form of granules, pellets, beads or flakes or as a powder, or in other particulate form. The powder may be a free-flowing powder. This transition metal component can have a high surface area; for example, when nickel powder may be employed, one may utilize Ni having a surface area of about 0.6 m$^2$/g (BET), such as nickel made by the so-called carbonyl process. Alternatively, one may generate high surface area transition metal component by an in situ production process; in one such embodiment, high surface area nickel may be produced in situ by using, as a precursor, NiO powder, which may be reduced prior to cathode manufacture.

An alkali halometallate may be a salt of an alkali metal cation and complex polyatomic anion, which contains at least a halogen bonded to a primary metal. The term "primary metal" is used as a term of convenience to refer to a metal that can form a complex anion with a halogen. Such complex anions may include anions such as $AlCl_4^-$, $ZnCl_3^-$, $ZnCl_4^{2-}$, $TiCl_6^{2-}$, $CuCl_2^-$, $SnCl_3^-$, $SnCl_4^{2-}$, or $SnCl_6^{2-}$; or the like. Similar complex anions of metal, halogen, and oxygen or other element may be used as appropriate. These complexes may have a number of halogen atoms bonded to a primary metal in excess of the usual valence number of the metal. Alternatively, one or more such halogen can be replaced by oxygen or other atom. A primary metal may include one or more selected from Al, Zn, Cu, and Sn; or the like. Use of Al and/or Zn as primary metal may be employed in one embodiment of the invention.

In some embodiments, the alkali halometallate includes Na, K, or a combination thereof. In some embodiments, the alkali halometallate includes at least one halogen selected from Cl, F, and Br. The cathode composition may further contain one or more free alkali metal halide including both a halogen and an alkali metal common to the alkali halometallate. For example, the electrolyte composition may include free solid NaCl in cases where $NaAlCl_4$ may be employed as an alkali halometallate.

Some suitable alkali halometallates include $NaCl:MCl_x$ complexes generally, such as $NaCl:AlCl_3$, $NaCl:ZnCl_2$, $NaCl:AlCl_3:ZnCl_2$, or combinations or mixtures of two or more thereof. The notation "$NaCl:MCl_x$" (where M may be one or more primary metal as previously defined above and x may be an integer of from at least 1 up to the oxidation state of M) may refer to a mixture and/or a complex salt including NaCl and $MCl_x$, in any mole ratio. In cases where the alkali halometallate salt includes $NaCl:AlCl_3$ to form a binary melt, the relative ratio of NaCl to $AlCl_3$ can be any mole ratio which may be effective to form a composition including molten $NaAlCl_4$ in the range of from about 100 degrees Celsius to 300 degrees Celsius. However, in some embodiments, the mole fraction used may be up to about 50 percent $AlCl_3$ in the $NaCl:AlCl_3$.

In accordance with at least some embodiments of the disclosure, the alkali halometallate may be in liquid or molten state when in use in electrochemical cells. Suitable melting points for alkali halometallates may be greater than 100 degrees Celsius, or less than about 400 degrees Celsius. In one embodiment, the melting point may fall within the range of from about 100 degrees Celsius to about 300 degrees Celsius. When in the molten state, such alkali halometallate may exhibit the phenomenon of ionic conductivity. Ionic conductivity may be a useful feature for a secondary electrolyte in energy storage cells. Inclusion of a phosphorus composition additive according to an embodiment of the invention may enhance ionic conductivity of a cathode composition, as well as improving cell performance generally.

For sodium metal halide batteries, performance and cycle life can be related to the inherent internal resistance of the cell components and the build-up of internal resistance as a function of the chemical and physical processes that occur during electrochemical cycling. Some physical processes that may contribute to this internal resistance may include aggregation of transition metals in the cathode composition; ripening of NaCl; and decrease of electrical conductivity during charging due to the formation of transition metal halide. Because internal resistance and power density may be inversely proportional, a suitable approach to improve power density and efficiency may be to lower the internal resistance of the cell.

A cathode composition of the present disclosure may not be wholly liquid or molten at a temperature below about 400 degrees Celsius; but may include at least one alkali halometallate component that may be molten at such temperature. The cathode composition, in use, may be semi-solid. Cathode compositions according to embodiments of the disclosure may additionally include solids such as free NaCl or other free alkali metal halide salts. Additionally, it may include other solids such as metallic transition metals and/or transition metal salts, as well as metallic main-group metals (e.g., Al).

In one embodiment, the phosphorus composition additive may be present in an amount effective to lower the ionic resistance of the cathode composition by more than about 1 percent in a defined temperature range. Other embodiments may include the phosphorus composition additive present in amounts that lower this ionic resistance by an amount in the range of from about 1 percent to about 15 percent, measured at a temperature in the range of from about 250 degrees Celsius to about 400 degrees Celsius, relative to absence of the additive. That is, when the ionic resistance of the cathode composition is measured at a temperature in the temperature range, the value of ionic resistance may be lowered by an amount in the specified range. In one embodiment, the additive may be present in an amount effective to lower the ionic resistance of the cathode composition by about 15 percent to about 30 percent in the temperature range of from about 300 degrees Celsius to about 350 degrees Celsius, relative to absence of the additive. Standard methods for measuring ionic resistance may be used.

In accordance with certain embodiments of the disclosure, the phosphorus composition additive may be selected from one or more of P—O compositions, P-halogen compositions, and P—O-halogen compositions. Other suitable additives may include the reaction products of the foregoing with an alkali halometallate. Suitable alkali halometallates may have a melting point of less than about 400 degrees Celsius, and in some embodiments may have a melting point that is less than 300 degrees Celsius, e.g., from about 100 degrees Celsius to about 300 degrees Celsius.

As used herein, a "P—Z" composition refers to a composition including, but not limited to, phosphorus and element Z. In some embodiments there is a direct chemical bond between P and element Z. That is, both a phosphorus oxide and a sodium phosphate may be considered P—O compositions. A suitable composition can fall into more than one category; thus, sodium fluorophosphate, for example, may be both a P—O composition and P-halogen composition. Furthermore, more than one type composition of P can be used as additive. A phosphorus composition additive will often be an inorganic salt or an inorganic ionic substance. Some suitable phosphorus compositions may include one or more selected from phosphorus oxides, phosphoric acids, phosphorous acids, hypophosphorous acids, metal phosphates, metal hydrogen phosphates, metal phosphites, metal hydrogen phosphites, metal hypophosphites, phosphorus halides, metal halophosphates, phosphorus oxyhalides, reaction products of any of the foregoing with alkali halometallate having a melting point of less than about 300 degrees Celsius, and combinations thereof; or the like. These include condensed forms of each of the above, e.g., where condensation of phosphate units may be seen, such as polyphosphates. In particular, at least one phosphorus composition additive may include one or more selected from $P_2O_5$, $P_4O_{10}$, $H_3PO_4$, $H_3PO_3$, $H_3PO_2$, $Na_3PO_4$, $NaH_2PO_4$, $Na_2HPO_4$, $Na_3PO_3$, $NaH_2PO_3$, $Na_2HPO_3$, $NaH_2PO_2$, $Na_2PO_3F$, $NaPO_2F_2$, $PCl_3$, $PCl_5$, and $POCl_3$. In other embodiments, the reaction products of any of the foregoing with the above-noted alkali halometallate may be suitable.

In accordance with at least some embodiments, the additive may be present in such amounts that the cathode composition has a mass ratio of phosphorus composition additive relative to the total mass of cathode composition that is greater than about $2 \times 10^{-6}$. In another embodiment, this mass ratio may be less than about $7 \times 10^{-2}$. In one embodiment, this mass ratio may be from about $1 \times 10^{-4}$ to about $2 \times 10^{-2}$. In one embodiment, this mass ratio may be from about $1 \times 10^{-4}$ to about $1 \times 10^{-2}$. Other suitable mass ratios may in ranges of from about $1 \times 10^{-4}$ to about $7 \times 10^{-2}$, or from about $2 \times 10^{-4}$ to about $2 \times 10^{-2}$, or from about $2 \times 10^{-6}$ to about $7 \times 10^{-2}$.

In another formulation, the phosphorus composition additive may be present in such amounts that the cathode composition has an atom ratio of P to primary metal (of the alkali halometallate) of more than about $1 \times 10^{-5}$. In one embodiment, the atom ratio may be less than about $3 \times 10^{-1}$. In one embodiment, this atom ratio may be in a range of from about $5 \times 10^{-4}$ to about $1 \times 10^{-1}$. In one embodiment, the atom ratio of P to primary metal may be in a range of from about $1 \times 10^{-3}$ to about $5 \times 10^{-2}$. Other suitable ranges may be, for example, from about $5 \times 10^{-4}$ to about $3 \times 10^{-1}$, or from about $1 \times 10^{-3}$ to about $1 \times 10^{-1}$, or from about $1 \times 10^{-5}$ to $3 \times 10^{-1}$. It may be noted that these two formulations above (i.e., whether denoted by mass ratio or atom ratio) do not always have to be simultaneously satisfied.

In yet another formulation, the additive may be present in such amounts that the cathode composition has a mass ratio of phosphorus composition additive to alkali halometallate of more than about $6 \times 10^{-6}$ or less than about $2 \times 10^{-1}$. In one embodiment, the mass ratio may be in a range of from about $3 \times 10^{-4}$ to about $6 \times 10^{-2}$. In one embodiment, the mass ratio may be in a range of from about $6 \times 10^{-4}$ to about $3 \times 10^{-2}$. Other suitable ranges may be from about $3 \times 10^{-4}$ to about $2 \times 10^{-1}$ or, from about $6 \times 10^{-4}$ to about $6 \times 10^{-2}$. Here, and elsewhere in the disclosure, the ratio and amount may be selected with reference to desired performance characteristics, end-use application specific parameters, and technical trade-offs. The formulations expressed as mass ratio of phosphorus composition additive to alkali halometallate, do not have to be simultaneously satisfied with those set forth above in the previous paragraphs.

In operation, the chemical components of a cathode composition composed of an alkali halometallate with a phosphorus composition additive may be a complex mixture. For example, in operation, a cathode composition initially including an alkali halometallate (e.g., $NaAlCl_4$) and a given phosphorus composition additive (e.g. a sodium phosphate) may react at ambient temperature or when brought to a defined operating temperature (e.g., 300 degrees Celsius). Such reaction may, at least in part, form species with phosphorus-chlorine bonds, or form complex sodium salts of phosphorus chlor-oxides, or other compositions, oligomers, and inorganic polymers including P and one or more of Al, O, Cl and Na. Alternatively, some or all of the initial P-containing additive may remain unreacted. Therefore, when the term "reaction product" may be employed, it may be intended to encompass any decomposition products and/or products of reaction as may occur when a phosphorus composition additive is brought into contact with an alkali halometallate.

Accordingly, the chemical form in which the additive exists while in operation within a cathode composition may be as a given phosphorus composition, and/or as a reaction product(s) of the foregoing. When a specific additive is named in this disclosure (e.g., $NaH_2PO_4$), that stoichiometric form is indicated, but can further embrace "reaction products" as aforementioned. Some of these reaction products may provide similar or even enhanced activity as does the initial form of the additive.

In combination with the additive including a phosphorus composition, as previously discussed, the cathode composition may further include one or more secondary additives. In some instances, such secondary additive may include one or more iodides, fluorides, bromides, sulfur, and sulfides. Sulfur may be added to the composition in the form of, e.g., elemental sulfur, or metal sulfides, while the halides may be added as alkali metal salts. In the alkali metal salts mentioned, the alkali metal may be common with the alkali halometallate. A secondary additive including a halide may be considered to be an "additive" where it differs from the halogen component of the alkali halometallate. These secondary additives may be present in an amount that is greater than about 0.001 percent by weight of the electrolyte composition. In one embodiment, the secondary additive may be present in an amount that is in a weight range of from 0.1 percent to about 30 percent of the weight of electrolyte composition. Other forms of these and other secondary additives are contemplated as being within the scope of this disclosure.

In accordance with embodiments of this disclosure, cathode compositions may be prepared by many methods, which may be constrained by such factors as economic considerations, processing concerns, yield issues, and/or performance issues in addition to considerations that pertain to the end-use and commensurate packaging. The phosphorus composition additive may be admixed with an alkali halometallate in an order and at a temperature determined by processing factors. As noted, suitable temperatures may be up to about 450 degrees Celsius. Each respective component (i.e., additive and alkali halometallate) depending on the processing stage may be independently in a solid or a liquid state. For example, a solid form of the additive may be mixed with a solid form of the alkali halometallate. Alternatively, the additive may be mixed with a precursor to the alkali halometallate (e.g., NaCl) and the resulting admixture combined with a reaction-partner precursor to the alkali halometallate (e.g., $AlCl_3$). The combination may be reacted to form the alkali halometallate (e.g., $NaAlCl_4$) in situ.

In other embodiments of this disclosure, the cathode composition may be made by a method of combining an alkali halometallate with another substance which itself includes the additive. For example, the electrolyte composition may be made by combining a solid cathodic material with an alkali halometallate, where the solid cathodic material includes the additive. In such embodiments, the additive exists initially in combination with a solid cathodic material, such as a transition metal and/or transition metal halide. Suitable transition metals may include at least one selected from the group consisting of Ni, Fe, Cu, Zn, Cr, Mn, and Co; or the like. After combination of this solid cathodic material with an alkali halometallate, a composition including the subject additive may be thus provided. Cathode compositions in accordance with embodiments may be prepared in a single step, or more typically, in several steps.

One exemplary but non-limiting embodiment for assembling a cathode for electrochemical cells includes combining (e.g., mixing) additives with transition metal (e.g., Ni) in powdery metallic form and with alkali halide (e.g., NaCl) during the preparation of cathode granules. After such granules are made, they may be suitably placed into a chamber for holding the cathode composition (e.g., a beta"-alumina tube equipped with a current collector) and filled with molten electrolyte (e.g., $NaAlCl_4$), under vacuum. This is referred to as the impregnation process. Alternatively, one may also combine additives (which may be in solid form) with granules, after granule preparation. Both modes may be within the scope of the present disclosure. For examples, additives that do not readily hydrolyze under granulation conditions may be added during the granulation process. Additives that may suffer hydrolysis may be added to granules, after the latter are made. It may be also possible to mix additives with the molten electrolyte, and later combine this with the granules to form the cathode mixture. If a precursor to an additive is volatile or gaseous, then vapors of such precursor may be combined with transition-metal containing granules. In all of these possible methods, it may be desirable (although not always required) to ensure a good distribution of additive in the granules. In some cases, a pore-former such as ammonium bicarbonate can be added to granules containing transition metal so as to increase porosity of these granules.

In one embodiment, the cathode composition may be disposed on an electronically conductive support structure. The support structure may be a foam, a mesh, a weave, a felt, or a plurality of packed particles, fibers, or whiskers. In one embodiment, a suitable support structure may be formed from carbon. A suitable carbon form may be reticulated foam. A support structure may also be formed from a metal, ceramic, or cermet material.

As noted, another embodiment of the invention includes a rechargeable electrochemical cell including, a first compartment including metallic alkali metal; a second compartment including a cathode composition, and a solid separator capable of transporting alkali metal ions between the first and second compartments. The cathode composition may be any of those noted above. The first compartment will be referred to as the "anode" or the "anode compartment", and the second compartment will be referred to as the "cathode" or the "cathode compartment". This reflects the function of each compartment during discharge of the cell. Cathode compositions in accordance with the disclosure may be retained in a compartment or container. The compartment may, for example, form an integral part of an electrochemical cell (for example, a chamber) or be suitable for assembly within an electrochemical cell. The compartment or container may also function as a separator (i.e., physically separates and electrically isolates an anode from the cathode composition in an electrochemical cell). For example, the compartment or container preferably has a wall at least partially including a solid ion-conducting electrolyte material, such as beta alumina.

In accordance with embodiments of the invention, a solid separator may be employed which capable of transporting alkali metal ions between the first and second compartments. The separator (e.g., the solid electrolyte material forming a wall of the compartment for the cathode composition), will be composed of a ceramic material, although the possibility exists that it may include ion-conducting glass or polymeric material, and combinations of these materials. In practice, the solid electrolyte material may be a conductor of sodium ions, being e.g. made of beta-alumina, nasicon or beta"-alumina. If it is required that the solid electrolyte be a conductor of ions other than those of sodium, other materials may be used, such as analogues of beta- or beta"-alumina that are capable of conducting other metallic ions such as the ions of other alkali metals.

Suitable separators may sometimes include a composite of alumina and a metal (ceramic) oxide. The alumina may be beta alumina, beta" alumina, or their mixture, characterized by a fast conductivity for sodium ions. Beta alumina has a composition range defined by $Na_2O$—$Al_2O_3$ phase diagram, although other species may be present. Beta alumina has hexagonal crystal structure and contains about 1 mole of $Na_2O$ to about 9 moles of $Al_2O_3$. Beta" alumina has a higher ratio of about 1 moles of $Na_2O$ to about 5 mole of $Al_2O_3$ and ordinarily has rhombohedral structure. Solid separators composed of beta"-alumina are often referred to as BASE (i.e., beta"-alumina solid electrolyte). In one embodiment, a portion of the separator may be alpha alumina and another portion of the separator may be beta alumina. The alpha alumina may be relatively more amenable to bonding (e.g., compression bonding) than beta alumina, and may help with sealing and/or fabrication of the cell.

The separator can be stabilized by the addition of small amounts of materials including, but not limited to lithia, magnesia, zinc oxide, yttria or similar oxides. These stabilizers may be used alone or in combination with themselves or with other materials. The solid separator may include one or more dopant. Suitable dopants may include oxide of a transition metal selected from iron, nickel, copper, chromium, manganese, cobalt or molybdenum. Sodium ion conductivity of one form of beta"-alumina separator electrolyte at 300 degrees Celsius may be in a range of from about 0.2 ohm$^{-1}$ cm$^{-1}$ to about 0.4 ohm$^{-1}$ cm$^{-1}$. The separator may also be a ceramic composite of an oxygen-ion conductor and one or both of beta- or beta"-alumina. In one embodiment, the separator may be a composite of beta" alumina and zirconia. Zirconia has good strength properties and good chemical stability. Thus, the resulting separator may be relatively mechanically stronger, more durable, and more reliable. Due to the associated chemically stable and strength, the composite separator may improve the reliability of the electrochemical cell and may allow the use of a thinner walled separator having less ionic resistance while maintaining a suitable electrical resistance. A thinner wall of the composite separator may provide relatively more strength while maintaining a suitably high ionic conductivity.

In cells according to embodiments of the disclosure, the solid separator may include a shape which may be flat, undulate, domed or dimpled, or includes a shape with a cross-sectional profile that may be an ellipse, triangle, cross, star, circle, cloverleaf, rectangular, square, or multi-lobal; or the like. These shapes may increase the surface of the solid separator/electrolyte and enhance accessibility to the cathode composition and the anode, resulting in higher cell power.

In one embodiment, the electrochemical cell includes a first (or anode) compartment containing a material, such as sodium, that can function as an anodic material. Other suitable anodic material may include one or both of lithium and potassium, and which may be used alternatively or additively with sodium. The anodic material may be molten during use. The cell may also include, or be in communication with, a reservoir of anodic material. The anodic material may also include a metal oxygen scavenger. Suitable metal oxygen scavengers may include one or more of manganese, vanadium, zirconium, aluminum, or titanium. Other useful anodic additives (i.e., materials added to the anode, as opposed to added to the cathode composition) may include materials that increase wetting of the separator surface by the molten anodic material. Additionally, some anodic additives may enhance the contact or wetting of the separator with regard to a current collector, to ensure substantially uniform current flow throughout the separator.

It may be contemplated that electrochemical cells of the present disclosure will be initially assembled in a discharged state, so that metallic alkali metal does not have to be handled. The reversible cell reaction applicable to cells of the present disclosure is $$2Na+MX_2 \longleftrightarrow 2NaX+M,$$

where M may be a divalent transition metal such as Ni and/or Fe, and X may be a halide, which may be chloride. Discharging occurs left to right, and charging right to left. Thus, a compartment may initially contain a composition of an alkali metal, such as NaCl, which may be converted into metallic sodium upon charging of the electrochemical cell.

A suitable electrochemical cell may include current collectors for each of the first and second compartments. The cell may have a plurality of current collectors including anode current collectors and cathode current collectors, where the current collectors have electrical contact with the anode and cathode materials. Suitable materials for the anode current collector may include Ti, Ni, Cu, Fe, or combinations of two or more thereof. Other suitable materials for the anode current collector may include steel or stainless steel. Still other suitable materials for the anode current collector may include carbon. The current collector may be plated or clad. The cathode current collector may be a wire, paddle or mesh formed from Pt, Pd, Au, Ni, Cu, C, Mo, or Ti, among others.

When in use or operation, suitable operating temperatures of electrochemical cells in accordance with embodiments may include, for example, temperatures of from about 200 degrees Celsius to about 500 degrees Celsius, more from about 250 degrees Celsius to about 335 degrees Celsius, or from about 335 degrees Celsius to about 400 degrees Celsius.

Figure 1:
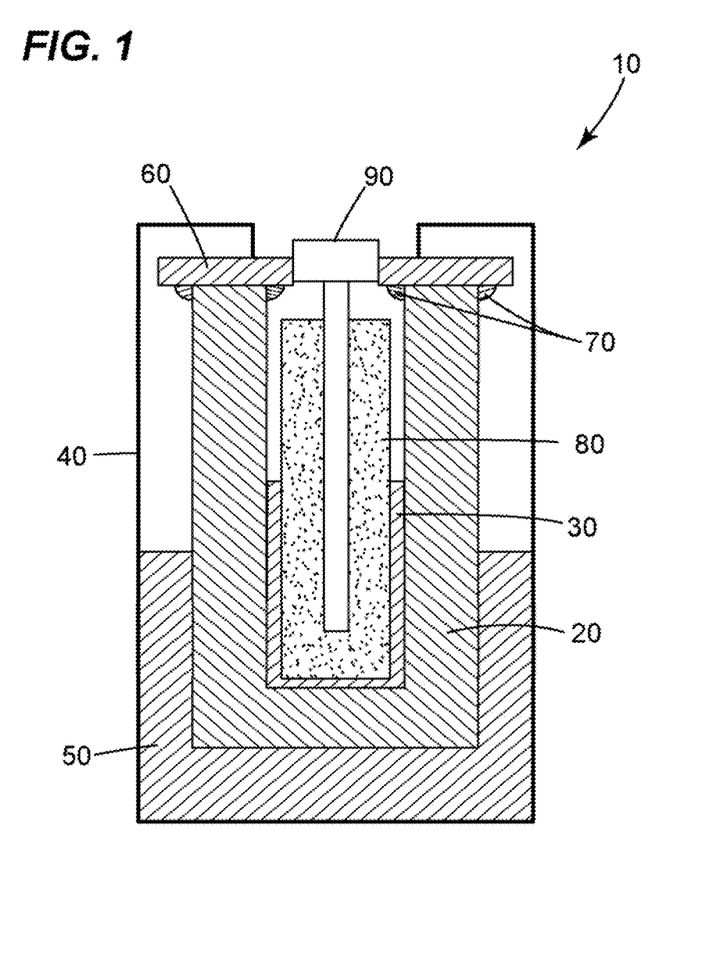
FIG. 1 is a schematic diagram depicting a cell in accordance with embodiments of this disclosure.

FIG. 1 is a schematic diagram depicting an exemplary embodiment of a sodium-metal halide battery cell 10. The cell 10 has a sodium-ion conductive beta-alumina electrolyte tube 20, a cathode compartment 30, a cell case 40 capable of containing elemental sodium 50 arranged at the outside of the electrolyte tube 20, a current collector 90 in electrical contact with the contents 80 of cathode compartment 30, and an electrically insulative alpha-alumina ceramic collar 60. The cathode compartment 30, which may contain any of the cathode compositions described herein as its contents 80, may be arranged at the inside of the electrolyte tube 20. The ceramic collar 60 joins the upper end of the electrolyte tube 20 by means of a seal structure 70, formed from a sealing glass.

A single cell has been described herein, it being understood that a plurality of such cells may be connected in series, as well as in parallel, to provide the required voltage and battery capacity for any specific use. Exemplary uses may include a vehicle, such as an electric car or locomotive, or in an electrical grid applications, such as for load leveling in electrical utilities, or the like. It may be contemplated to be within the scope of this disclosure to include an energy storage battery including a plurality of rechargeable electrochemical cells in accordance with the description set forth above.

EXAMPLES

Examples are provided for illustrative purposes and do not limit the scope of the claimed invention. The materials presented are commercially available from such common chemical suppliers as Sigma Aldrich, Inc. unless otherwise specified.

Example 1

Effect of $NaH_2PO_4$

Figure 2:
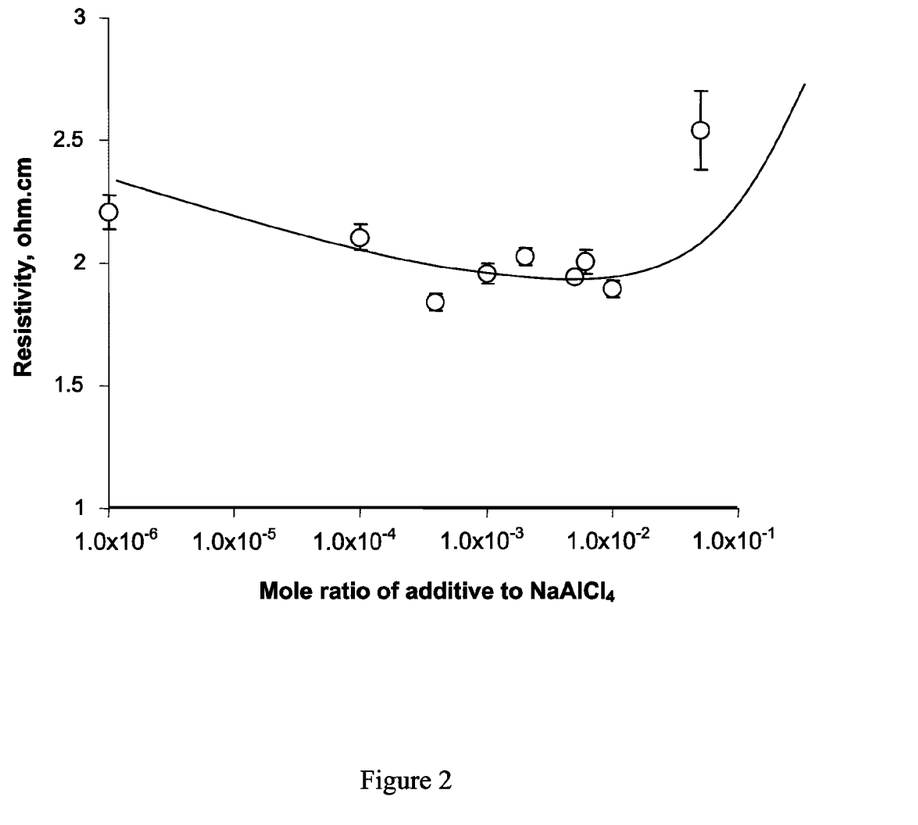
FIG. 2 is a graph showing reduction in ionic resistance of a molten electrolyte engendered by additives in accordance with embodiments of this disclosure.

The effect is determined for the addition of $NaH_2PO_4$ on the ionic resistance/conductivity of a representative molten electrolyte, viz., $NaAlCl_4$. FIG. 2 shows a graph of the ionic resistance of the molten electrolyte (in ohm-cm) as a function of mole ratio of the additive in the molten electrolyte at 300 degrees Celsius. Ionic resistance is measured in the substantial absence of air and water using impedance spectroscopy having a four-point probe electrode configuration, to measure changes in resistance.

A minimum in the value of ionic resistance is demonstrated over a range for mole ratio for the additive. Lowering of the ionic resistance by about 10 percent or more is possible via manipulation of the additive level. At values approaching mole ratio of 0.1 for $NaH_2PO_4$ in $NaAlCl_4$, however, ionic resistance began to inflect.

Example 2

Cell Evaluation

Figure 3:
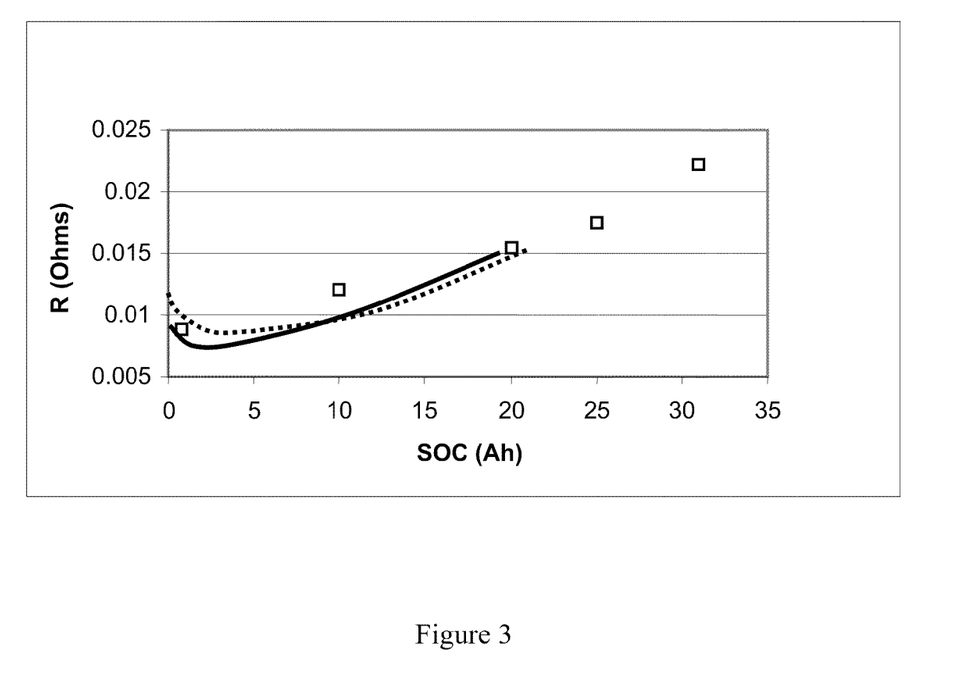
FIG. 3 is a graph showing internal cell resistance as a function of states of charge of cells.

A set of three complete sodium-metal halide cells are prepared, which are substantially identical except for identity of cathodic composition. A representative cathode composition including nickel granules combined with $NaH_2PO_4$ additive (represented by a solid line in FIG. 3), is compared with two baseline cathodic materials. The baseline cathodic materials include a conventional, commercially available Ni—Fe material (represented by squares in FIG. 3), and nickel granules obtainable from Beta Battery Ltd. (represented by a dotted line in FIG. 3). The secondary electrolyte includes $NaAlCl_4$ and the solid separator includes BASE. FIG. 3 is a graph of internal cell resistance R (in ohms) vs. state of charge (SOC) of the cell (in A-h). The minimum for internal resistance is pronounced for the nickel-$NaH_2PO_4$ at low SOC.

However, with reference to certain end-use applications, the measure of fuel savings may be dominated by initial values of R at a relatively low SOC. Calculations based on the results of FIG. 3 predict a potential for 10 percent fuel savings with 16 cells of this kind in a diesel powered hybrid vehicle with regenerative braking capability.

It may be desirable for the phosphorus composition additive in the cathode composition of a cell to be present in an amount that is effective to lower any capacity degradation rate of the cell during operation relative to absence of the additive. The phosphorus composition additive may be present in the cathode composition of a cell in an amount effective to lower the internal resistance of the cell when under operating conditions relative to absence of the additive. Cells of the present disclosure have been found to exhibit a higher discharge energy after multiple cycles under operating conditions relative to absence of the additive. This may lead in some instances to relatively increased power density, enhanced cycle life, as well as overall lower internal cell resistance, over a wide range for state of charge of the cell.

The additives in accordance with this disclosure may catalyze the reversibility of the Ni/Ni chloride redox reaction, and may control and/or affect cathodic grain growth. The presence of the additive may decrease the internal resistance of a cell or battery, when a cell is in a low SOC (state of charge).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity may be inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

The foregoing examples are merely illustrative of some of the features of the invention. The appended clauses are intended to define the invention as broadly as it has been conceived and the examples herein presented are illustrative of selected embodiments from a manifold of all possible embodiments. Accordingly it is Applicants' intention that the appended clauses are not to be limited in definition by the choice of examples utilized to illustrate features of the present invention. As used in the clauses, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art, and those variations should be construed to be covered in the appended clauses. It is also anticipated that advances in science and technology will make equivalents and substitutions possible that are not now contemplated by reason of the imprecision of language and these variations should also be construed where possible to be covered by the appended clauses.

The invention claimed is:

1. A cathode composition, comprising:
   a transition metal;
   an alkali halometallate; and
   a phosphorus composition additive, wherein the phosphorus composition additive comprises a P—O compound selected from one of more of phosphorus oxides, phosphoric acids, phosphorous acids, hypophosphorous acids, metal phosphates, metal hydrogen phosphates, metal phosphites, metal hydrogen phosphites, or metal hypophosphites.

2. The cathode composition of claim 1, further comprising one or more alkali metal halide.

3. The cathode composition of claim 1, further comprising metallic aluminum.

4. The cathode composition of claim 1, wherein the transition metal comprises one or more of Fe, Cu, Zn, Cr, Mn, or Co.

5. The cathode composition of claim 1, wherein the transition metal comprises Ni.

6. The cathode composition of claim 1, further comprising at least one halide of a transition metal.

7. The cathode composition of claim 1, wherein the alkali halometallate has a melting point in the range of from about 100 degrees Celsius to about 300 degrees Celsius.

8. The cathode composition of claim 1, wherein the alkali halometallate is a halometallate of a primary metal selected from at least one of Al, Zn, Cu, and Sn.

9. The cathode composition of claim 8, wherein the alkali halometallate comprises $NaAlCl_4$.

10. The cathode composition of claim 8, wherein the phosphorus composition additive is present at an atom ratio of P to primary metal of between about $1\times10^{-5}/1$ and about $3\times10^{-1}/1$.

11. The cathode composition of claim 1, wherein the phosphorus composition additive is present at a mass ratio relative to the total mass of cathode composition in a range of between about $2\times10^{-6}/1$ and about $7\times10^{-2}/1$.

12. The cathode composition of claim 1, wherein the phosphorus composition additive is present is an amount effective to lower the ionic resistance of the cathode composition by about 1 percent to about 30 percent in the temperature range of about 250 degrees Celsius to about 400 degrees Celsius, relative to absence of the additive.

13. The cathode composition of claim 1, wherein the phosphorus composition additive is present in an amount sufficient to form a mass ratio relative to the alkali halometallate that is in a range of between about $6\times10^{-6}/1$ and about $2\times10^{-1}/1$.

14. The cathode composition of claim 1, wherein the phosphorus composition additive comprises one of more of $P_2O_5$, $P_4O_{10}$, $H_3PO_4$, $H_3PO_3$, $H_3PO_2$, $Na_3PO_4$, $NaH_2PO_4$, $Na_2HPO_4$, $Na_3PO_3$, $NaH_2PO_3$, $Na_2HPO_3$, or $NaH_2PO_2$.

15. The cathode composition of claim 1, wherein the composition further comprises one or more secondary additive element comprising at least one of iodide, fluoride, bromide, sulfur, or sulfide.

16. An electrochemical cell, comprising:
a first compartment comprising metallic alkali metal;
a second compartment comprising a cathode composition, the cathode composition comprising:
 a transition metal;
 an alkali halometallate; and
 a phosphorus composition additive comprising a P—O compound selected from one of more of phosphorus oxides, phosphoric acids, phosphorous acids, hydrophosphorous acids, metal phosphates, metal hydrogen phosphates, metal phosphites, metal hydrogen phosphites, or metal hypophosphites;
an electrically insulative separator capable of transporting alkali ions between the first and second compartments.

17. The cell of claim 16, further comprising a current collector for each of the first and second compartments.

18. The cell of claim 16, wherein the alkali halometallate is molten under operating conditions of the cell.

19. An energy storage battery comprising a plurality of rechargeable electrochemical cells, each cell in accordance with claim 16.

20. An electrochemical cell, comprising:
a first compartment comprising metallic sodium;
a second compartment comprising a cathode composition, the cathode composition comprising:
 a transition metal; a sodium halometallate; and a phosphorus composition additive; wherein the phosphorus composition additive comprises a P—O compound selected from one of more of phosphorus oxides, phosphoric acids, phosphorous acids, hydrophosphorous acids, metal phosphates, metal hydrogen phosphates, metal phosphites, metal hydrogen phosphites, or metal hypophosphites; and wherein the phosphorus composition additive is present at a mass ratio relative to the total mass of cathode composition in a range of between about $2\times10^{-6}/1$ and about $7\times10^{-2}/1$; and
an electrically insulative solid separator capable of transporting alkali metal ions between the first and second compartments.

* * * * *

UNITED STATES PATENT AND TRADEMARK OFFICE
CERTIFICATE OF CORRECTION

PATENT NO. : 8,435,673 B2
APPLICATION NO. : 12/433107
DATED : May 7, 2013
INVENTOR(S) : Lemmon et al.

It is certified that error appears in the above-identified patent and that said Letters Patent is hereby corrected as shown below:

In the Specification:

In Column 4, Line 40, delete "$1 \times 10^{-4}$" and insert -- $2 \times 10^{-4}$ --, therefor.

In the Claims:

In Column 11, Line 32, Claim 12, delete "is present is an" and insert -- is present in an --, therefor.

Signed and Sealed this
Ninth Day of July, 2013

Teresa Stanek Rea
*Acting Director of the United States Patent and Trademark Office*